(12) United States Patent
Kong et al.

(10) Patent No.: US 10,095,097 B2
(45) Date of Patent: Oct. 9, 2018

(54) PROJECTION-TYPE OPTICAL MODULE

(71) Applicant: Hyundai Motor Company, Seoul (KR)

(72) Inventors: Nak Kyoung Kong, Seongnam-si (KR); Jong Min Park, Seoul (KR); Joong Ryoul Lee, Incheon (KR); Kap Je Sung, Suwon-si (KR); Ki Hong Lee, Seoul (KR); Keon Soo Jin, Ulsan (KR); Jin Ho Hwang, Seoul (KR); Soon Cheol Choi, Namyangju-si (KR); Seung Ki Hong, Gyeonggi-do (KR); Jae Wook Lee, Seoul (KR); Chang Joon Seok, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/486,977

(22) Filed: Apr. 13, 2017

(65) Prior Publication Data
US 2018/0149958 A1    May 31, 2018

(30) Foreign Application Priority Data

Nov. 29, 2016  (KR) .......................... 10-2016-0159804

(51) Int. Cl.
| | |
|---|---|
| *G03B 21/28* | (2006.01) |
| *H04N 9/31* | (2006.01) |
| *G02B 27/01* | (2006.01) |
| *G03B 21/602* | (2014.01) |
| *G02B 13/16* | (2006.01) |

(Continued)

(52) U.S. Cl.
CPC .............. *G03B 21/28* (2013.01); *B60K 35/00* (2013.01); *B60R 1/00* (2013.01); *G02B 9/62* (2013.01); *G02B 13/16* (2013.01); *G02B 27/01* (2013.01); *G03B 21/602* (2013.01); *H04N 9/317* (2013.01); *B60K 2350/106* (2013.01); *B60K 2350/2052* (2013.01)

(58) Field of Classification Search
CPC ...... G03B 21/28; G03B 21/10; H04N 9/3141; H04N 9/317; G02B 27/01
USPC .......................................... 353/98, 99, 77, 78
See application file for complete search history.

(56) References Cited

U.S. PATENT DOCUMENTS

| | | | |
|---|---|---|---|
| 6,181,386 B1 * | 1/2001 | Knox ..................... | G03B 21/10 348/781 |
| 6,400,394 B1 | 6/2002 | Kim et al. | |

(Continued)

FOREIGN PATENT DOCUMENTS

| | | |
|---|---|---|
| JP | H11239365 A | 8/1999 |
| JP | 2002174703 A | 6/2002 |

(Continued)

*Primary Examiner* — Ryan Howard
(74) *Attorney, Agent, or Firm* — Slater Matsil, LLP

(57) ABSTRACT

A projection-type optical module is provided. More particularly, the projection-type optical module is configured to have a plurality of reflective mirrors and disposed inside a vehicle or a pillar of the vehicle so as to display an image projected from an image module on a wide screen. The projection-type optical module can be disposed in a confined space of the interior of the vehicle, so that the interior space of the vehicle can be efficiently used. Furthermore, the projection-type optical module is configured such that an image refracted in a confined space is prevented from blurring, thus making it possible to display a clear projection image on the screen module.

20 Claims, 7 Drawing Sheets

(51) Int. Cl.
    *G02B 9/62*     (2006.01)
    *B60K 35/00*    (2006.01)
    *B60R 1/00*     (2006.01)

(56)            References Cited

U.S. PATENT DOCUMENTS

| 2009/0268164 A1* | 10/2009 | Bowden ............... B60K 35/00 353/13 |
| 2011/0019270 A1* | 1/2011 | Kitano ................... G02B 3/08 359/361 |
| 2011/0194035 A1* | 8/2011 | Aizawa ................ G02B 17/08 348/744 |
| 2014/0104694 A1 | 4/2014 | Lee et al. |
| 2015/0002819 A1 | 1/2015 | Schuck et al. |
| 2016/0041460 A1 | 2/2016 | Schuck et al. |

FOREIGN PATENT DOCUMENTS

| JP | 2002357768 A | 12/2002 |
| JP | 2015072479 A | 4/2015 |
| JP | 2015125299 A | 7/2015 |
| KR | 20090094224 A | 9/2009 |
| KR | 10-2010-0023179 | 2/2011 |
| KR | 101017086 B1 | 2/2011 |
| KR | 101217745 B1 | 1/2013 |
| KR | 101483978 B1 | 1/2015 |

* cited by examiner

PROJECTION-TYPE OPTICAL MODULE

CROSS-REFERENCE TO RELATED APPLICATIONS

This application claims under 35 U.S.C. § 119(a) the benefit of priority to Korean Patent Application No. 10-2016-0159804, filed on Nov. 29, 2016, the entire contents of which are incorporated herein by reference.

TECHNICAL FIELD

The present disclosure relates to a projection-type optical module.

BACKGROUND

Recently, to enhance the visibility for a vehicle, research on a vehicle including a camera module system provided with a plurality of cameras installed on the outside of the vehicle to enable a driver or a passenger in the vehicle to check outside conditions of the vehicle has been carried out.

Moreover, such a vehicle is provided with a screen for displaying images received from the plurality of cameras on the interior of the vehicle through an optical module. In this regard, development of related devices for assisting in driving of the vehicle and improving convenience in use has become appreciably more active.

Meanwhile, unlike the configuration of an optical module embedded in a cowl top cover or a dashboard of a vehicle, in the case of a subminiature projection optical module mounted in an A-filler or B-filler, there is a problem of low visibility because the size of an image projected onto a screen is small.

Furthermore, with regard to installation of such a subminiature projector, it is not easy to dispose the projector in an interior part of the vehicle and secure a space for configuration of a projection-type optical module for projecting an image having a predetermined size sufficient to provide appropriate visibility.

FIG. 1 illustrates a projection lens unit for a pico-projector according to the conventional technique proposed in Korean Patent Application No. 10-2008-0081806 (hereinafter, referred to as 'Document 1'). The projection lens unit includes a lens array formed of five sheets, a color synthesizing prism, a cover glass and an image panel.

However, in the case of the configuration of Document 1, it is difficult to provide the projection-type optical module in a confined space of the interior of the vehicle. Moreover, there is still a problem in that it is difficult to project an image onto a wide area having a predetermined size sufficient to provide appropriate visibility.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

An object of the present invention is to provide a projection-type optical module which is configured such that a plurality of reflective mirrors are provided in a confined space and an image can be projected onto a wide area, and which can be disposed in a crush panel or a pillar of a vehicle, thus making it possible to efficiently use the interior space of the vehicle because it can be installed in a confined space of the interior of the vehicle.

Another object of the present invention is to provide a projection-type optical module in which a plurality of lenses are sequentially arranged to prevent blurring of an image which is refracted in a confined space, thus providing a clear projection image.

In one aspect, the present invention provides a projection-type optical module disposed inside a vehicle, including: a screen module disposed inside the vehicle; at least one image module including a plurality of lenses and configured to project an image; a first reflective mirror configured to reflect the image projected from the image module; and a second reflective mirror configured to reflect the projected image reflected by the first reflective mirror again and project the image onto the screen module.

In a preferred embodiment, the first reflective mirror may be oriented at an angle ranging from 51° to 55° with respect to a horizontal direction and configured to face the image module.

In another preferred embodiment, the second reflective mirror may face the first reflective mirror and be oriented at an angle ranging from 40.8° to 44.8° with respect to a horizontal direction.

In still another preferred embodiment, the image module may be configured to project the image at an angle of 12°, and the first reflective mirror may be oriented at an angle ranging from 51° to 55° depending on an image projection angle of the image module.

In yet another preferred embodiment, the image module may include an illumination optical system configured to project the image.

In still yet another preferred embodiment, the screen module may include a diffusing film and a substrate lens.

In a further preferred embodiment, the projection-type optical module may include a Fresnel lens disposed on the screen module.

In another further preferred embodiment, the image module may include a plurality of image modules corresponding to the size of the screen module.

In still another further preferred embodiment, the distance between the screen module and the image module may range from 15 mm to 25 mm.

In yet another further preferred embodiment, the screen module may have an aspect ratio of 5:2.8.

In still yet another further preferred embodiment, the projection-type optical module may be coupled with another projection-type optical module, wherein the screen modules of the projection-type optical modules may be coupled with each other.

In a still further preferred embodiment, the image module may include a projection optical system including six lenses.

In a yet still further preferred embodiment, the six lenses of the projection optical system may be sequentially arranged, and the six lenses may include, in a sequence from a lens close to the screen module to a lens distant therefrom, a first lens having a negative refractive power, a second lens having a positive refractive power, a third lens having a negative refractive power, a fourth lens having a negative refractive power, a fifth lens having a positive refractive power, and a sixth lens having a positive refractive power.

In a yet still further preferred embodiment, the sixth lens may have a spherical surface shape.

In a yet still further preferred embodiment, the sixth lens may be made of glass.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
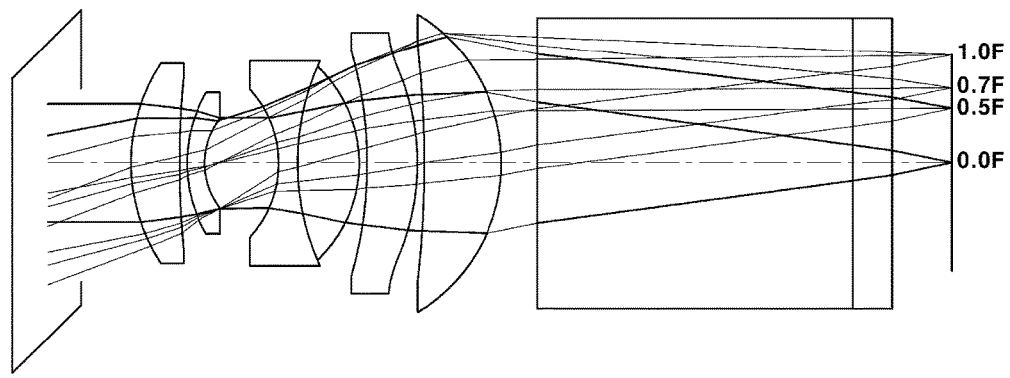
FIG. 1 illustrates a configuration that five sheets of lenses are arranged in the prior art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

More particularly, it relates to a projection-type optical module which is configured such that a plurality of reflective plates are disposed in a confined space at upper and lower positions facing each other so that an image projected from a projection optical module is projected onto a plurality of screen modules which can cooperate with each other, and accordingly a wider projected image can be provided in a place having spatial constraints.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Furthermore, the terms, such as " . . . part", " . . . unit", "module", "assembly", etc., indicate a unit for processing at least one function or operation.

In the following detailed description, names of constituents, which are in the same relationship, are divided into "the first", "the second", etc., but the present invention is not necessarily limited to the order in the following description.

Figure 2:
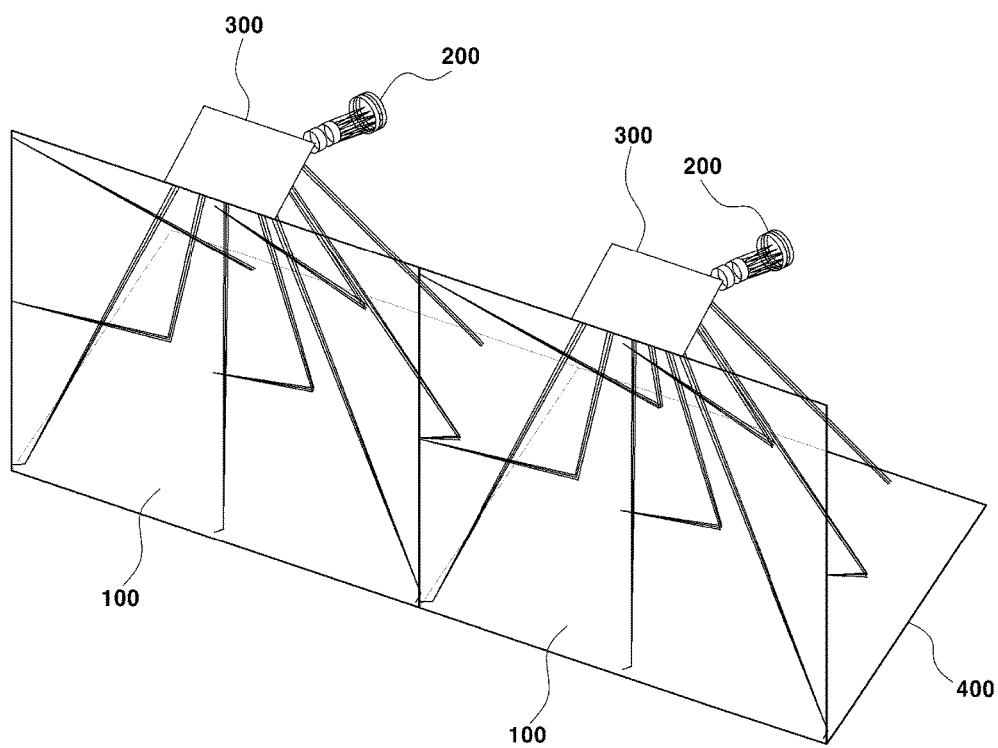
FIG. 2 is a perspective view illustrating a projection-type optical module, in which two optical modules are connected with each other according to an embodiment of the present invention.

FIG. 2 illustrates the configuration of two projection-type optical modules connected with each other according to an embodiment of the present invention.

Each projection-type optical module according to an embodiment of the present invention includes a screen module 100, a first reflective mirror 300, a second reflective mirror 400 and an image module 200. Each projection-type optical module is configured such that adjacent projection-type optical modules can be coupled to each other and arranged. Furthermore, at least one or more image modules 200 may be provided for the screen module 100 that may have various sizes. At least one or more image modules 200 may be provided for a single screen. In addition, a single image module 200 may be provided for a single screen module 100. Given this, the single screen module 100 is configured such that, as a request of a user, a plurality of projection-type optical modules may be coupled to each other. That is, the projection-type optical module in accordance with an embodiment of the present invention has a structure capable of coupling individual optical modules to each other, so that the coupling relationship of the screen modules 100 can be set depending on the size of the image.

The projection-type optical module in accordance with an embodiment of the present invention is configured such that it is installed in a confined space inside or outside the vehicle. Thus, preferably, the projection-type optical module may be configured such that it can be installed in an A-pillar, a B-pillar, a C-pillar, a luggage box, a console, a crush pad, a seat, a headrest, or the like.

In an embodiment of the present invention, the screen module 100 is configured to face the interior of the vehicle and a screen having a ratio of 5:2.8 may be used in the screen module 100. Moreover, the screen module 100 may have a Fresnel lens 130 so that an image projected from the image module 200 can be displayed on the screen module 100 in a parallel projection manner.

As shown in FIG. 2, two image modules 200 are provided, corresponding to a single screen having a ratio of 10:2.8. That is, there is illustrated an embodiment in which the two image modules 200 are provided, corresponding to a configuration including two coupled screen modules 100 each of which has a ratio of 5:2.8.

Figure 3:
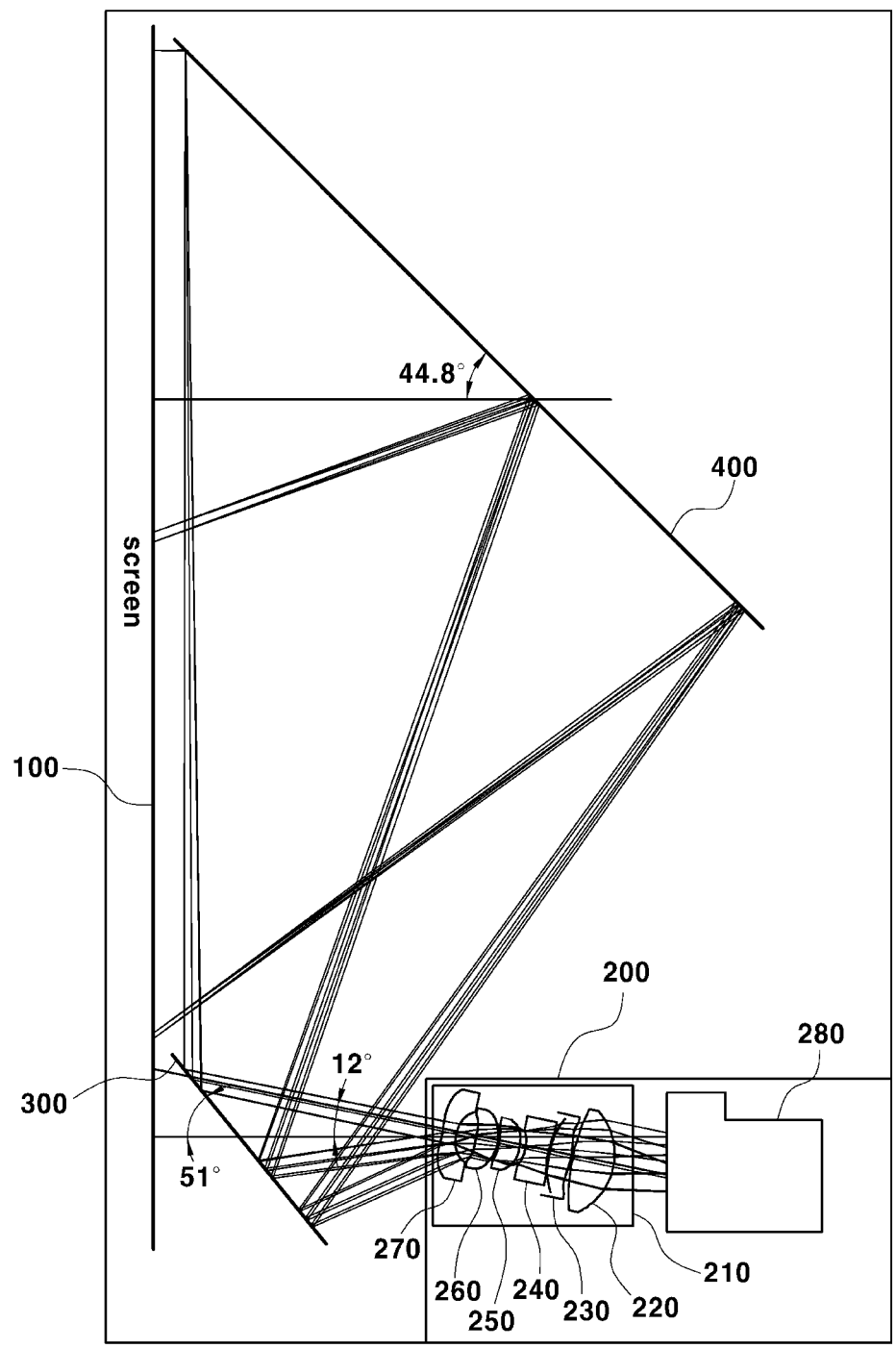
FIG. 3 is a side sectional view of the projection-type optical module according to an embodiment of the present invention.

FIG. 3 is a side sectional view of the projection-type optical module according to an embodiment of the present invention.

The image module 200 projects an image required by the user at an angle ranging from 10° to 15° with respect to the horizontal direction. More preferably, the image module 200 may project an image at an angle of 12° in the horizontal direction.

As such, in the case where the image module 200 projects an image at an angle of 12°, the projected image is reflected by the first reflective mirror 300. The first reflective mirror 300 is configured such that it is oriented at an angle ranging from 51° to 55° with respect to the horizontal direction of the projection-type optical module. More preferably, in this embodiment of the present invention, the first reflective mirror 300 may be configured such that it is oriented at an angle of 51°.

An image projected from the image module 200 oriented at an angle 12° is reflected by the first reflective mirror 300 oriented at an angle of 51° with respect to the horizontal direction. The image reflected by the first reflective mirror 300 is reflected by the second reflective mirror 400 again. With regard to the reflection of the projected images by the first reflective mirror 300 and the second reflective mirror 400, the associated components are configured such that they are oriented at predetermined angles at which optical path disturbance or optical interference can be prevented. In this embodiment of the present invention, the second reflective mirror 400 is oriented at an angle ranging from 40.8° to 44.8°. More preferably, the first reflective mirror 300 is oriented at an angle of 51°, and the second reflective mirror 400 is oriented at an angle of 44.8°.

In the configuration in accordance with an embodiment of the present invention, if the angle of the second reflective mirror 400 is reduced, the width and volume of the projection-type optical module for performing image projection onto the same screen module 100 is increased. Therefore, the image module 200 and the first reflective mirror 300 of the projection-type optical module are configured such that the angle of the second reflective mirror 400 falls within the range from 40.8° to 44.8°. As such, the image module 200 and the first reflective mirror 300 are configured based on the angle of the second reflective mirror 400. Given this, the projection-type optical module may be configured to have an area ranging from 93 cm$^2$ to 100 cm$^2$.

In addition, as described above, even if the orientation angles of the image module 200, the first reflective mirror 30 and the second reflective mirror 400 are changed, optical characteristics such as the density of the image, the performance of the image and the size of the screen can be maintained constant.

Figure 4:
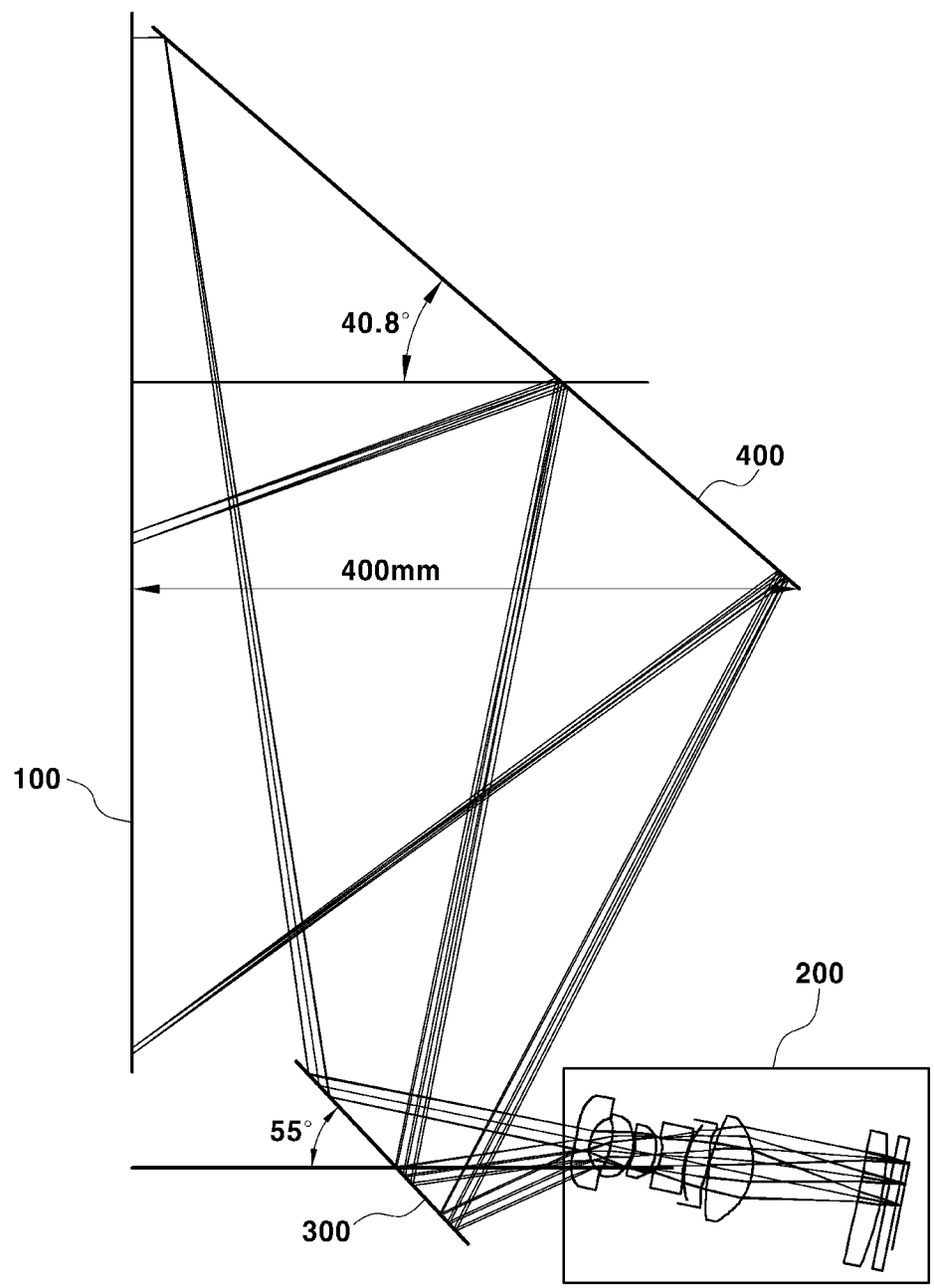
FIG. 4 is a side sectional view of a projection-type optical module according to another embodiment of the present invention.

FIG. 4 illustrates another embodiment of the present invention. In the case where the image module 200 projects an image at an angle of 12° in the horizontal direction, the first reflective mirror 300 may be configured to be oriented at an angle of 55°, and the second reflective mirror 400 may be configured to be oriented at an angle of 40.8°. The orientation angles of the first and second reflective mirrors are determined so that optical path disturbance or optical interference can be prevented.

In accordance with an embodiment of the present invention, a throw ratio (a projection distance/a height of the screen) at which an image is projected onto a 5 inch screen module 100 through the first reflective mirror 300 and the second reflective mirror 400 is 0.15 to 0.16. Therefore, in an embodiment of the present invention, the distance between the image module 200 and the screen module 100 may range from 15 mm to 25 mm. More preferably, the projection-type optical module is configured such that the distance between the image module 200 and the screen is 18 mm.

Figure 5:
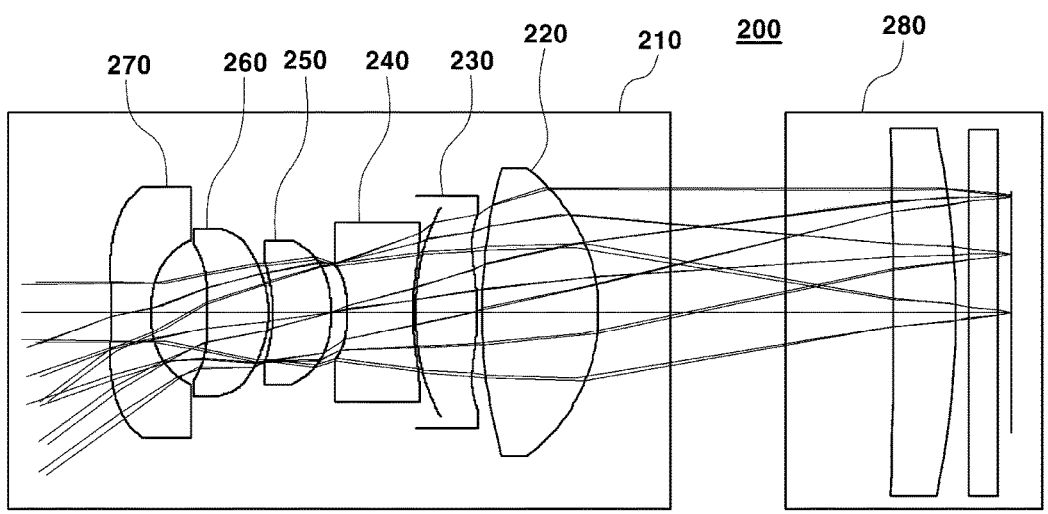
FIG. 5 is a side sectional view illustrating lenses forming a projection optical system according to an embodiment of the present invention.

FIG. 5 illustrates the image module 200 in accordance with an embodiment of the present invention. The image module 200 includes a projection optical system 210 and an illumination optical system 280. The illumination optical system 280 may include a digital micromirror device (DMD), and an image projected from the DMD element is incident on the projection optical system 210.

In the present embodiment, the projection optical system 210 includes six lenses that are sequentially arranged. The six lenses include first to sixth lenses that are arranged in a sequence from a component close to the screen module 100 to a component distant therefrom. The projection optical system 210 having the above-mentioned configuration can remove an optical aberration (occurring when light passing through a lens does not converge onto one point, and leading to blurring of an image), thus making it possible to project an optimal image.

Moreover, the first to fifth lenses are made of plastic and, preferably, are sequentially formed of low, high, low, high, and low-refractive index resin so as to embody the performance of the respective lenses.

The first lens is a component disposed closest to the screen and functions as a wide-angle lens for embodying a comparatively large image on a short projection distance. Furthermore, the sixth lens may be formed of glass and have a curved surface shape.

The following table shows materials and specifications of the six lenses included in the projection optical system 210.

TABLE 1

| | Focal distance | Material | Refractive index | Surface shape | Refractive power |
|---|---|---|---|---|---|
| First lens | −3.92 | Plastic | 1.531 | aspherical | Negative |
| Second lens | 4.203 | Plastic | 1.632 | aspherical | Positive |
| Third lens | −56.414 | Plastic | 1.531 | aspherical | Negative |
| Fourth lens | −3.233 | Plastic | 1.632 | aspherical | Negative |
| Fifth lens | 6.448 | Plastic | 1.531 | aspherical | Positive |
| Sixth lens | 6.345 | glass | 1.497 | spherical | Positive |

As such, the first to sixth lenses that are sequentially arranged may be configured such that they respectively have negative, positive, negative, negative, positive, and positive refractive powers.

Figure 6:
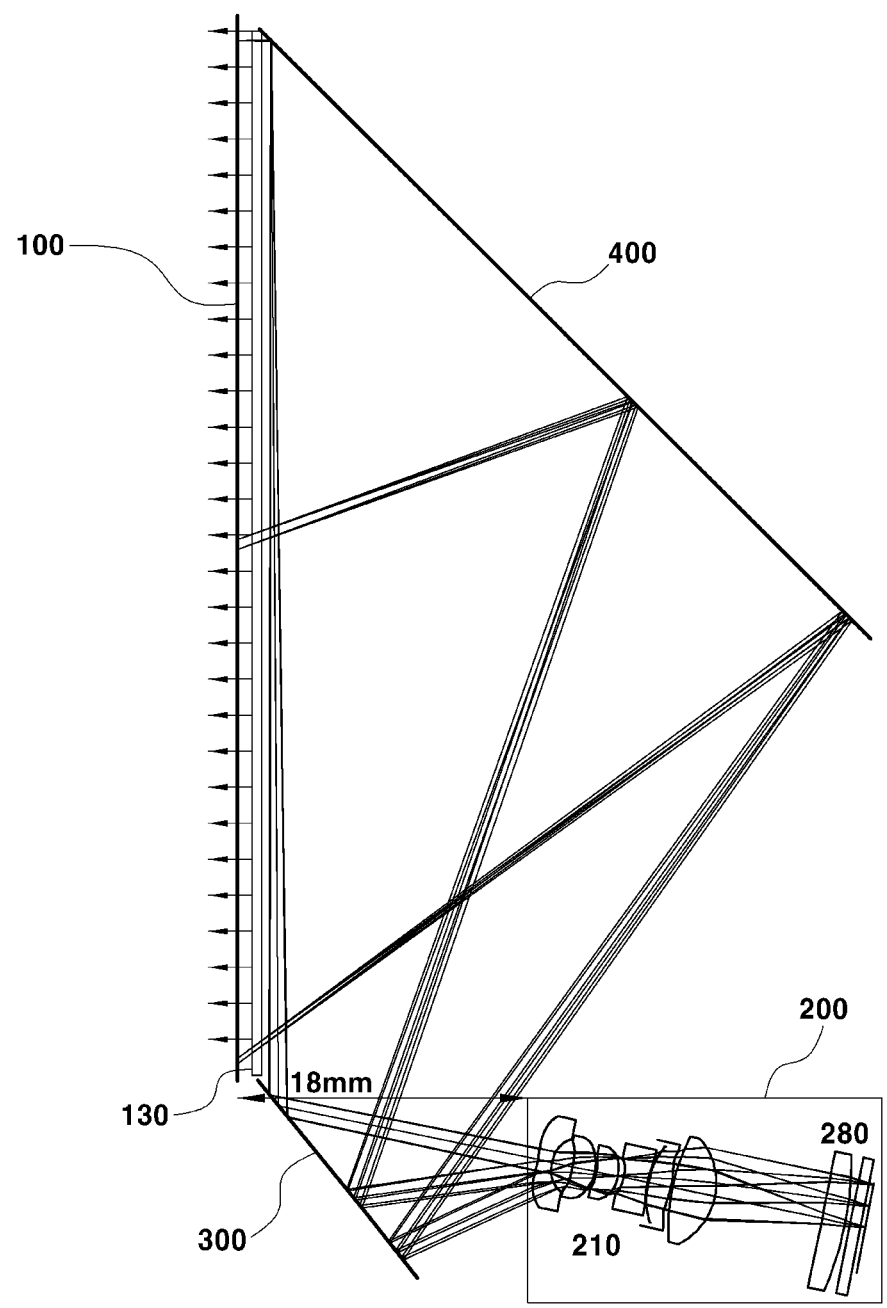
FIG. 6 illustrates the configuration in which an image is projected in a parallel projection manner through a Fresnel lens disposed in a screen module, according to an embodiment of the present invention.

FIG. 6 illustrates an embodiment of the present invention, showing a side sectional view of the screen module 100 including the Fresnel lens 130.

As shown in the drawing, the Fresnel lens 130 may be disposed inside or outside the screen module 100 and function to project an image or picture reflected by the second reflective mirror 400 onto the screen module 100 in a parallel projection manner. More preferably, a substrate lens 120 or a diffusing film no constituting the screen module 100 may be processed to have the same shape as the Fresnel lens 130.

Figure 7A:
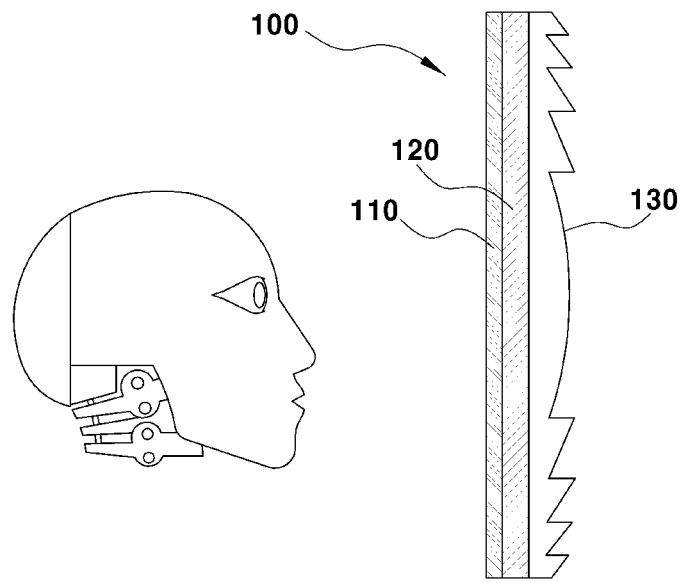
FIG. 7A is a side sectional view illustrating layers constituting a screen module according to an embodiment of the present invention.

FIG. 7A is a sectional view showing a stacked structure of the screen module 100 according to an embodiment of the present invention.

The screen module 100 in accordance with an embodiment of the present invention may be configured in the form in which a substrate lens 120 formed of polycarbonate (PC) or acryl, a diffusing film no and a Fresnel lens 130 are stacked. The diffusing film no is disposed inside the vehicle at a position onto which an image is projected. The substrate lens 120 and the Fresnel lens 130 are sequentially stacked toward the inside of the optical module.

Figure 7B:
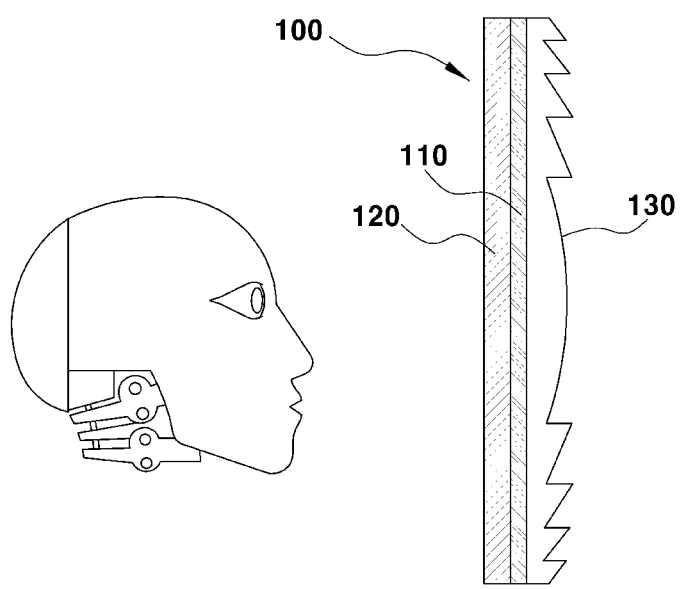
FIG. 7B is a side sectional view illustrating layers constituting a screen module according to an embodiment of the present invention.

FIG. 7B illustrates another embodiment of the present invention. The screen module 100 may be configured in such a way that a substrate lens 120 formed of polycarbonate (PC) or acryl is disposed inside the vehicle at a position onto which an image is projected. The substrate lens 120 the diffusing film no and the Fresnel lens 130 are sequentially stacked toward the inside of the optical module.

Figure 7C:
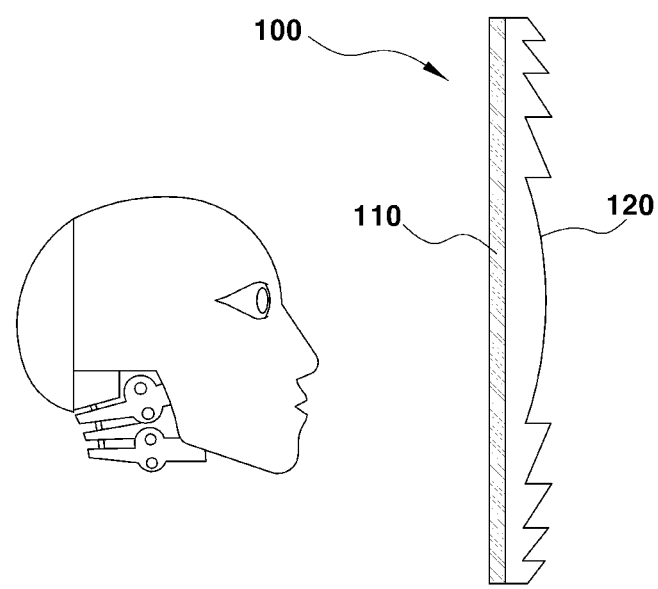
FIG. 7C is a side sectional view illustrating layers constituting a screen module according to an embodiment of the present invention.

FIG. 7C illustrate a further embodiment of the present invention, showing a screen module 100 comprising a diffusing film no and a substrate lens 120.

In this embodiment, the screen module 100 is configured such that the substrate lens 120 is formed to have a function combined with that of a Fresnel lens. The diffusing film no is disposed at a position at which an image is projected. The substrate lens 120 formed to have the same function as that of the Fresnel lens is mounted inside the optical module.

Therefore, the substrate lens 120 can function to convert a projected image reflected by the second reflective mirror 400 into a parallel form, thus providing a screen module 100 in which there is no need for use of a separate Fresnel lens.

As is apparent from the above description, a projection-type optical module in accordance with embodiments of the present invention has the following effects.

In various embodiments of the present invention, a projection-type optical module is disposed in a confined space and is configured to include a wider screen module disposed in an internal space of a vehicle, whereby a confined space in the vehicle can be more effectively used.

Furthermore, an image can be projected onto a wide screen module having high visibility, so that convenience in use can be improved.

In addition, embodiments of the present invention are configured such that a plurality of screen modules can be coupled to each other, whereby depending on specifications of a vehicle or a production request by a user, the size of a screen can be selectively provided.

Furthermore, the use of a plurality of lenses can prevent an image formed on the screen from blurring and enhance the quality of an image projected onto the screen.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A projection-type optical module disposed inside a vehicle, comprising:
a screen module disposed inside the vehicle;
at least one image module including a plurality of lenses and configured to project an image;
a first reflective mirror configured to reflect the image projected from the image module; and
a second reflective mirror configured to reflect the projected image reflected by the first reflective mirror again and project the image onto the screen module,
wherein the plurality of lenses comprise six lenses,
wherein the six lenses comprise, in a sequence from a lens close to the screen module to a lens distant therefrom, a first lens having a negative refractive power, a second lens having a positive refractive power, a third lens having a negative refractive power, a fourth lens having a negative refractive power, a fifth lens having a positive refractive power, and a sixth lens having a positive refractive power.

2. The projection-type optical module of claim 1, wherein the first reflective mirror is oriented at an angle ranging from 51° to 55° with respect to a horizontal direction and configured to face the image module, and wherein the second reflective mirror faces the first reflective mirror and is oriented at an angle ranging from 40.8° to 44.8° with respect to a horizontal direction.

3. The projection-type optical module of claim 1, wherein the image module is configured to project the image at an angle of 12°, and the first reflective mirror is oriented at an angle ranging from 51° to 55° depending on an image projection angle of the image module.

4. The projection-type optical module of claim 1, comprising:
a Fresnel lens disposed on the screen module.

5. The projection-type optical module of claim 1, wherein the screen module comprises a diffusing film and a substrate lens.

6. The projection-type optical module of claim 1, wherein the image module comprises a plurality of image modules corresponding to a size of the screen module.

7. The projection-type optical module of claim 1, wherein a distance between the screen module and the image module ranges from 15 mm to 25 mm.

8. The projection-type optical module of claim 1, wherein the screen module has an aspect ratio of 5:2.8.

9. The projection-type optical module of claim 1, wherein the projection-type optical module is coupled with another projection-type optical module, and wherein the screen module of the projection-type optical module and a screen module of the another projection-type optical module are coupled with each other.

10. The projection-type optical module of claim 1, wherein the plurality of lenses comprise exactly and not more than six lenses.

11. The projection-type optical module of claim 1, wherein the sixth lens has a spherical surface shape.

12. The projection-type optical module of claim 1, wherein the sixth lens is made of glass.

13. A modular optical apparatus comprising:
a screen disposed inside a vehicle;
an optical system disposed inside the vehicle, the optical system including a plurality of lenses and configured to output light rays for forming an image;
a first reflective mirror configured to reflect the light rays from the optical system; and
a second reflective mirror configured to reflect the light rays reflected by the first reflective mirror again and project the image onto the screen,
wherein the plurality of lenses comprise six lenses arranged sequentially, and
wherein the six lenses, along a sequence starting from the screen in a direction away from the screen, comprise
a first lens having a negative refractive power,
a second lens having a positive refractive power,
a third lens having a negative refractive power,
a fourth lens having a negative refractive power,
a fifth lens having a positive refractive power, and
a sixth lens having a positive refractive power.

14. The modular optical apparatus of claim 13, wherein the first reflective mirror faces the optical system, the second reflective mirror faces the first reflective mirror.

15. The modular optical apparatus of claim 13, further comprising a Fresnel lens disposed on the screen.

16. The modular optical apparatus of claim 13, further comprising a diffusing film and a substrate lens disposed on the screen.

17. The modular optical apparatus of claim 16, wherein the substrate lens is configured to generate a parallel beam of light rays from the reflected light rays from the second reflective mirror.

18. The modular optical apparatus of claim 13, further comprising:
   a substrate lens disposed on the screen, and facing a Fresnel lens; and
   a stack of a diffusing film and the substrate lens disposed under the Fresnel lens, wherein the diffusing film is disposed between the Fresnel lens and the substrate lens.

19. The modular optical apparatus of claim 13, further comprising:
   a substrate lens disposed on the screen, and facing a Fresnel lens; and
   a stack of a diffusing film and the substrate lens disposed under the Fresnel lens, wherein the substrate lens is disposed between the Fresnel lens and the diffusing film.

20. A modular optical apparatus comprising:
   a screen disposed inside a vehicle;
   an optical system disposed inside the vehicle, the optical system including a plurality of lenses and configured to output light rays for forming an image;
   a first reflective mirror configured to reflect the light rays from the optical system; and
   a second reflective mirror configured to reflect the light rays reflected by the first reflective mirror again and project the image onto the screen,
   wherein the plurality of lenses comprise six lenses arranged sequentially, and
   wherein the six lenses, along a sequence starting from the screen in a direction away from the screen, comprise
      a first lens having a negative refractive power,
      a second lens having a positive refractive power,
      a third lens having a negative refractive power,
      a fourth lens having a negative refractive power,
      a fifth lens having a positive refractive power, and
      a sixth lens having a positive refractive power, wherein the first lens, the second lens, the third lens, the fourth lens, and the fifth lens comprise plastic, and the sixth lens comprises glass, wherein the first lens, the second lens, the third lens, the fourth lens, and the fifth lens comprise aspherical surface, and wherein the sixth lens comprises a spherical surface.

* * * * *